United States Patent
Fukushima et al.

(10) Patent No.: US 9,890,027 B2
(45) Date of Patent: Feb. 13, 2018

(54) BEVERAGE SUPPLY APPARATUS WITH TOUCH PANEL CONTROL

(71) Applicant: Panasonic Intellectual Property Management Co., Ltd., Osaka-shi, Osaka (JP)

(72) Inventors: Naoto Fukushima, Gunma (JP); Taiki Terada, Shiga (JP); Atsushi Makino, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 14/976,899

(22) Filed: Dec. 21, 2015

(65) Prior Publication Data

US 2016/0185587 A1    Jun. 30, 2016

(30) Foreign Application Priority Data

Dec. 24, 2014    (JP) .................................. 2014-260643

(51) Int. Cl.
*G06F 3/0488* (2013.01)
*B67D 1/08* (2006.01)

(52) U.S. Cl.
CPC ......... *B67D 1/0888* (2013.01); *B67D 1/0894* (2013.01); *G06F 3/0488* (2013.01)

(58) Field of Classification Search
CPC .... G06F 3/0488; B67D 1/0888; B67D 1/0894
See application file for complete search history.

(56) References Cited

U.S. PATENT DOCUMENTS

| 2010/0139493 | A1 | 6/2010 | Nevarez et al. |
| 2011/0017776 | A1* | 1/2011 | Metropulos .......... B67D 1/0888 222/129.1 |
| 2014/0263442 | A1* | 9/2014 | Connerat ............. B67D 1/0078 222/105 |
| 2015/0170533 | A1 | 6/2015 | Hayashi et al. |

FOREIGN PATENT DOCUMENTS

| JP | 2012-510886 | 5/2012 |
| WO | 2014-034826 | 3/2014 |

OTHER PUBLICATIONS

Certificate for application of exceptions to lack of novelty of invention, dated Dec. 25, 2014, and English translation, 3 pages total.

* cited by examiner

*Primary Examiner* — Lisa Landis
(74) *Attorney, Agent, or Firm* — Hamre, Schumann, Mueller & Larson, P.C.

(57) ABSTRACT

An object is to allow the users to easily recognize where to put the beverage container for a corresponding nozzle even when multiple nozzles for dispensing beverages are present. Upon reception of a selection operation to select one beverage from options for multiple kinds of beverages displayed on a touch panel, a control section identifies the beverage supply port for dispensing the beverage selected by the selection operation among multiple beverage supply ports and controls the touch panel to indicate a container holder corresponding to the beverage supply port for dispensing the beverage.

9 Claims, 13 Drawing Sheets

| BEVERAGE KINDS | BEVERAGE SUPPLY PORT |
|---|---|
| HOT WATER | 5a |
| CATEGORIES 1, 2, 3 AND 4 | 5b |

FIG. 5

ABSTRACT

BEVERAGE SUPPLY APPARATUS WITH TOUCH PANEL CONTROL

CROSS REFERENCE TO RELATED APPLICATION

This application is entitled to and claims the benefit of Japanese Patent Application No. 2014-260643, filed on Dec. 24, 2014, the disclosure of which including the specification, drawings and abstract is incorporated herein by reference in its entirety.

TECHNICAL FIELD

The present invention relates to a beverage supply apparatus that supplies a beverage.

BACKGROUND ART

Heretofore, beverage supply apparatuses have been known, which are capable of supplying a plurality of kinds of high-temperature beverages using hot water, such as coffee, tea, and green tea, for example.

In recent years, beverage supply apparatuses have been proposed, each configured to display a plurality of beverage options on a touch panel, to make the beverage selected on the touch panel by the user and to dispense the beverage from a beverage supply port such as a nozzle as with the techniques disclosed in Patent Literature (hereinafter, referred to as "PTL") 1 and PTL 2, for example.

CITATION LIST

Patent Literature

PTL 1
Japanese Unexamined Patent Application Publication (Translation of PCT Application) No. 2012-510886
PTL 2
WO 2014-034826

SUMMARY OF INVENTION

Technical Problem

The beverage supply apparatuses disclosed in PTLs 1 and 2 are each provided with a single beverage supply port for dispensing the beverage thus made, so that the user can easily recognize the beverage supply port where the beverage is dispensed. When the user puts a beverage container at a position corresponding to the beverage supply port, the beverage is supplied appropriately to the inside of the beverage container. However, when a plurality of beverage supply ports is present, and different beverage supply ports are used for dispensing beverages depending on the kinds of beverages, there arises a problem in that it is difficult for the user to recognize from which beverage supply port the beverage selected on the touch panel by the user is dispensed.

In particular, with a beverage supply apparatus that supplies a high-temperature beverage using hot water, when the user puts a beverage container by mistake at a position corresponding to a beverage supply port not used for dispensing the beverage, the beverage thus made spills without being placed in the beverage container and may cause the user to burn himself or herself.

For this reason, there has been a high demand for developing a technique that allows, even when a plurality of beverage supply ports for dispensing beverages is present, the user to easily recognize at which beverage supply port the user should put the beverage container among the plurality of beverage supply ports.

The present invention aims to provide a beverage supply apparatus capable of allowing, even when a plurality of beverage supply ports for dispensing beverages is present, the user to easily recognize at which beverage supply port the user should put the beverage container among the plurality of beverage supply ports.

Solution to Problem

A beverage supply apparatus according to an aspect of the present invention is an apparatus that supplies a plurality of kinds of beverages, the apparatus including: a plurality of beverage supply ports each used for dispensing any one of the plurality of kinds of beverages; a touch panel that displays options for the plurality of kinds of beverages and that receives a selection operation to select one of the plurality of kinds of beverages; and a control section that identifies the beverage supply port for dispensing the beverage selected by the selection operation among the plurality of beverage supply ports and that controls the touch panel to indicate a beverage container space corresponding to the identified beverage supply port.

Advantageous Effects of Invention

According to the aspect of the present invention, it is possible to allow, even when a plurality of beverage supply ports for dispensing beverages is present, the user to easily recognize at which beverage supply port the user should put the beverage container among the plurality of beverage supply ports.

BRIEF DESCRIPTION OF DRAWINGS

FIG. 5 is a diagram illustrating a table used for controlling the beverage supply apparatus according to the embodiment of the present invention;

DESCRIPTION OF EMBODIMENTS

Hereinafter, a description will be given of a beverage supply apparatus according to each embodiment of the present invention in detail.

Figure 1:
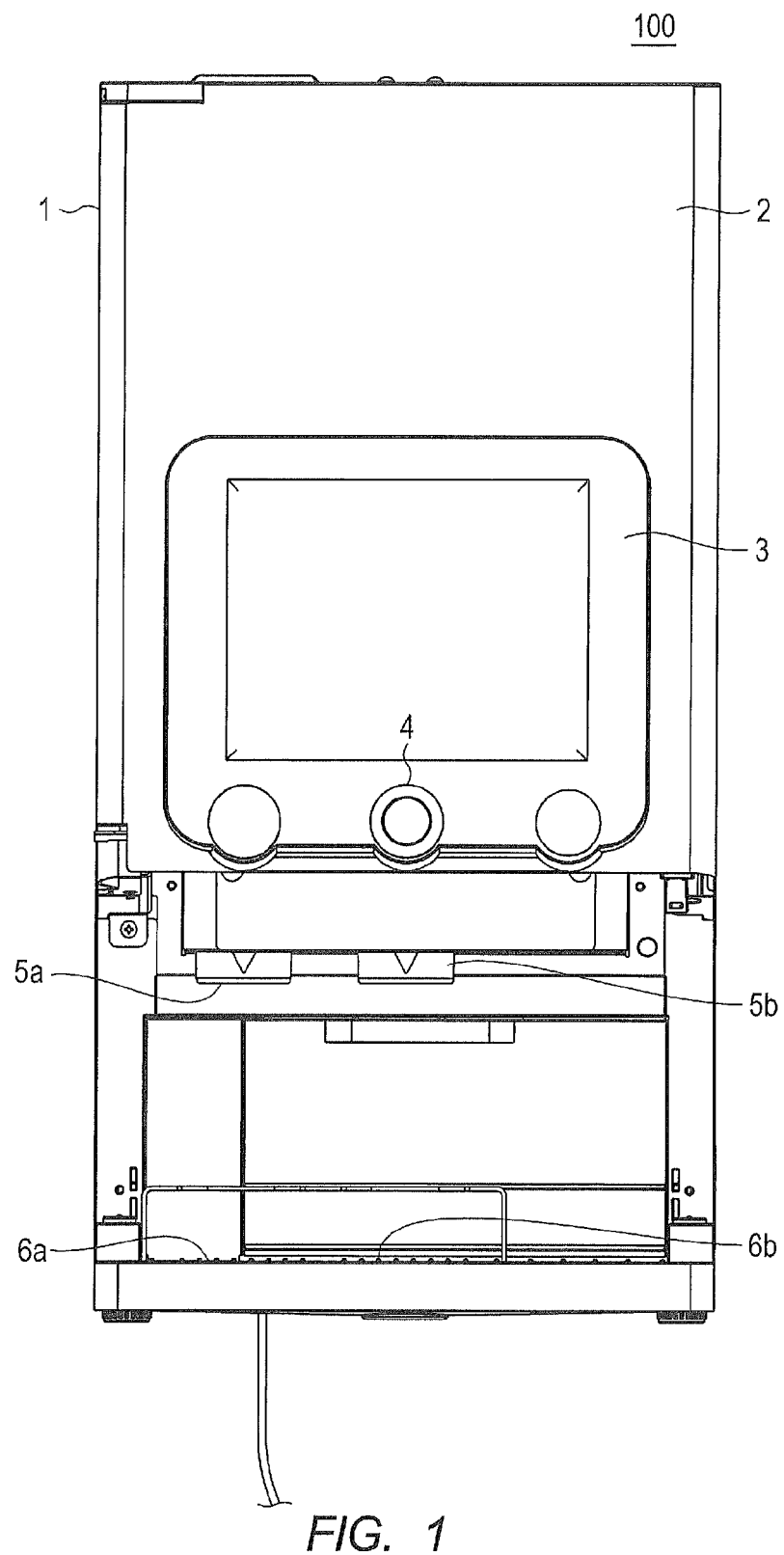
FIG. 1 is a front view of an external structure of a beverage supply apparatus according to an embodiment of the present invention.
Figure 2:
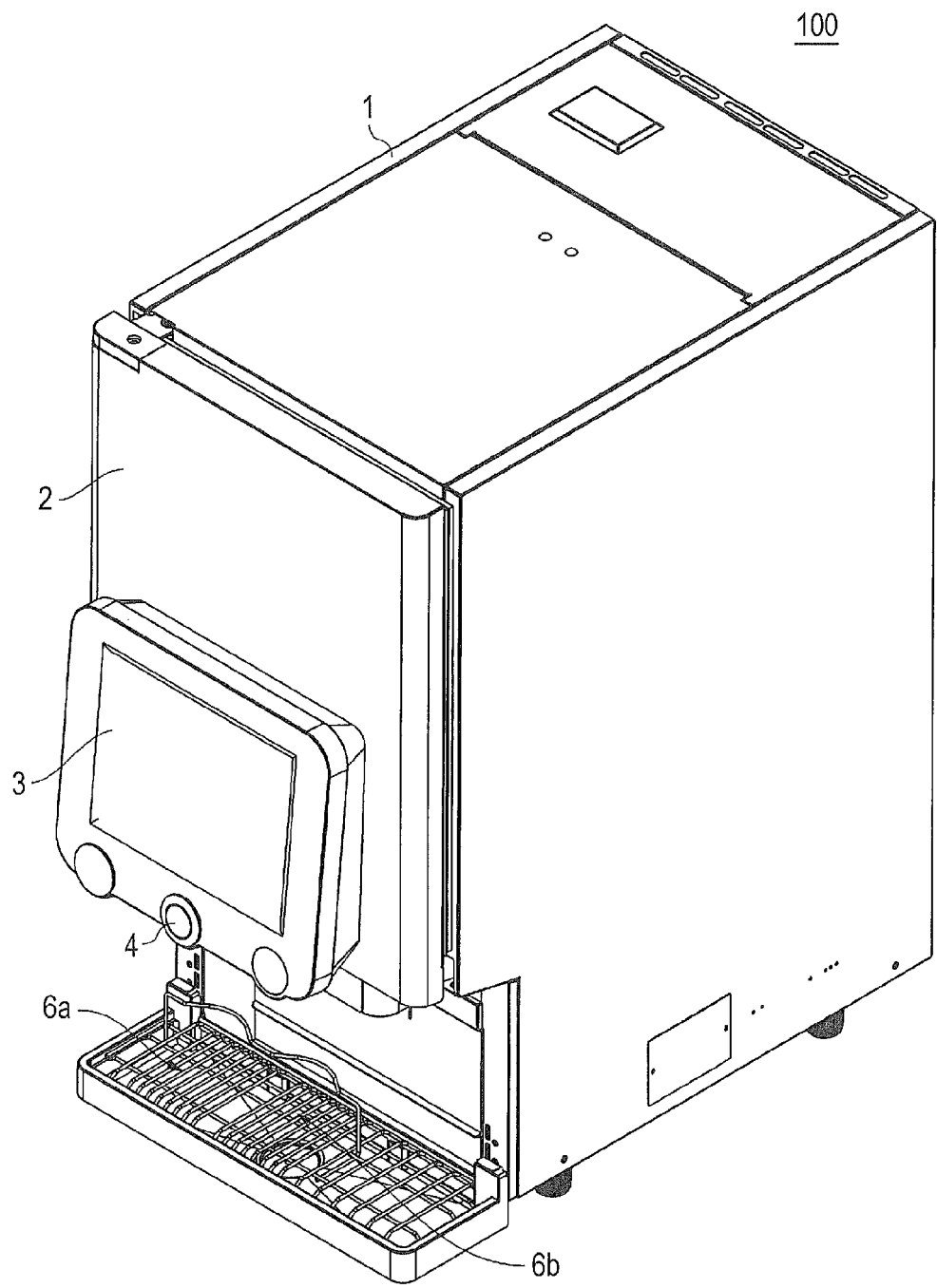
FIG. 2 is a perspective view of the external structure of the beverage supply apparatus according to the embodiment of the present invention.
Figure 3:
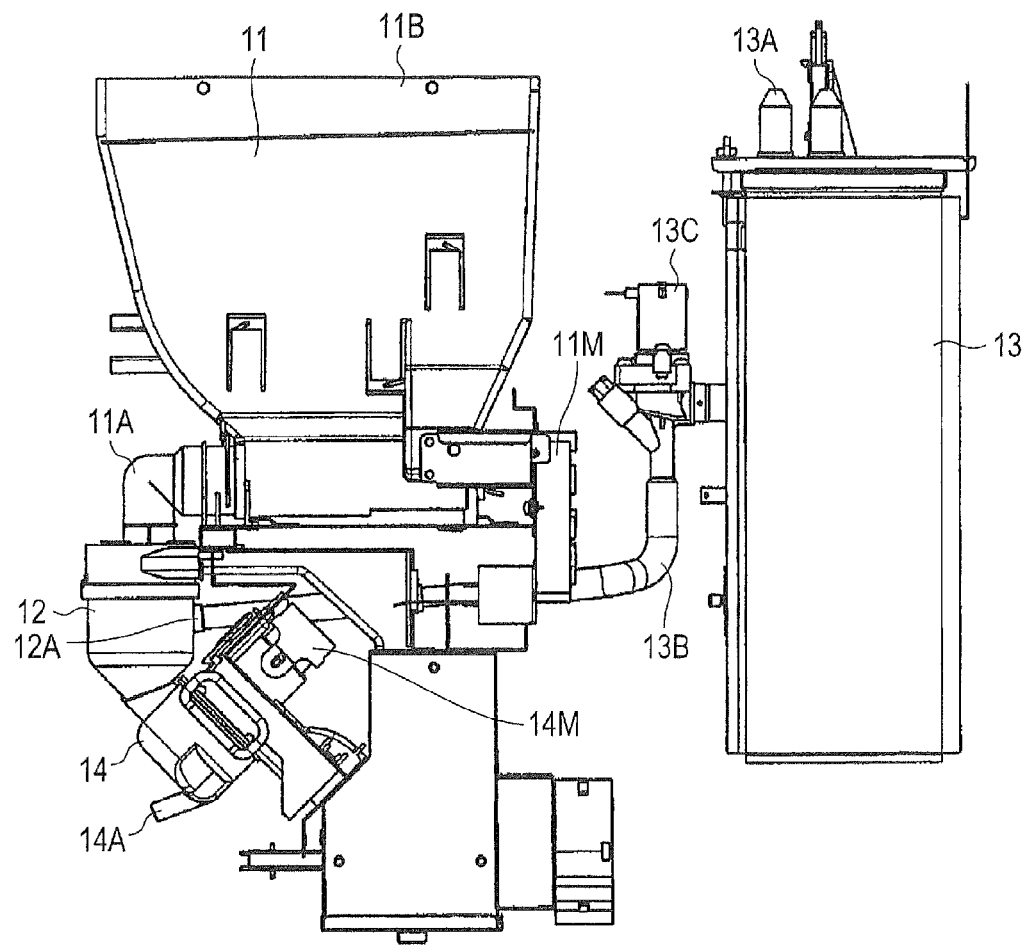
FIG. 3 is a diagram illustrating of a beverage supply mechanism of the beverage supply apparatus according to the embodiment of the present invention.

First, a description will be given of an exemplary configuration of beverage supply apparatus 100 according to an embodiment of the present invention using FIGS. 1 to 3. FIG. 1 is a front view of beverage supply apparatus 100 according to the embodiment of the present invention and FIG. 2 is a perspective view of the same. FIG. 3 is a diagram illustrating a beverage supply mechanism of beverage supply apparatus 100 according the embodiment of the present invention.

[External Structure of Beverage Supply Apparatus 100]

A description will be given of an external structure of beverage supply apparatus 100 with reference to FIG. 1.

As illustrated in FIGS. 1 and 2, beverage supply apparatus 100 includes case 1, front door 2, touch panel 3, physical button 4, beverage supply ports 5a and 5b, and container spaces 6a and 6b (beverage container spaces).

Case 1 is a casing component that holds a beverage supply mechanism therein and that includes front door 2, touch panel 3, physical button 4, beverage supply ports 5a and 5b, and container spaces 6a and 6b at the front face of the casing component. The beverage supply mechanism will be described in details hereinafter.

Front door 2 is attached to the front face of case 1 to be operable. Front door 2 is usually closed and locked to prevent the users from opening and closing front door 2. Front door 2 is opened during maintenance, for example, and a service man of beverage supply apparatus 100 can access the beverage supply mechanism from the front face portion of case 1.

Touch panel 3 displays beverage options and/or a message for the users of beverage supply apparatus 100, for example, and is an operation receiving section that receives a beverage selection operation performed by the users.

More specifically, touch panel 3 displays, for the users, information on the kinds of beverages that can be supplied by beverage supply apparatus 100, displays information for the users to select which kind of beverage to be supplied, and displays indication to clarify where to put the beverage container. A detailed description will be given of a display example of touch panel 3, hereinafter.

Physical button 4 is a button provided at a lower portion of touch panel 3 and used to start supply of the beverage selected by pressing on touch panel 3. Physical button 4 may be configured with an LED embedded around physical button 4, for example, and configured to light the LED by control section 20 to be described hereinafter to prompt the user to press physical button 4.

Beverage supply ports 5a and 5b are each a dispensing port for dispensing hot water and/or a beverage. In beverage supply apparatus 100 according to the embodiment of the present invention, beverage supply port 5a is connected to hot-water supply tube 13B of hot-water tank 13 to be described hereinafter, while beverage supply port 5b internally includes nozzle 14A to be described hereinafter and supplies a beverage via nozzle 14A. As illustrated in FIG. 1, beverage supply ports 5a and 5b are provided below touch panel 3 at the front face of case 1.

Container spaces 6a and 6b are a base portion for placing beverage containers that receive hot water and/or a beverage dispensed from beverage supply ports 5a and 5b, and as illustrated in FIG. 2, container spaces 6a and 6b are provided immediately below beverage supply ports 5a and 5b, respectively. Container space 6a is a base portion for placing a beverage container that receives hot water dispensed from beverage supply port 5a, and container space 6b is a base portion for placing a beverage container that receives a beverage dispensed from beverage supply port 5b.

[Beverage Supply Mechanism]

Next, a detailed description will be given of the beverage supply mechanism.

FIG. 3 is a diagram illustrating a lateral view of the beverage supply mechanism, and the left side of the diagram corresponds to the front side of beverage supply apparatus 100, and the right side of the diagram corresponds to the rear side of the same. As illustrated in FIG. 3, the beverage supply mechanism includes canister 11, chute 12, hot-water tank 13, and agitation vessel 14. An assumption is made that the beverage supply mechanism is housed inside case 1, but may be exposed outside from case 1 because hot-water tank 13 has a large capacity, for example, and also heats up to a high temperature. In this configuration, hot-water tank 13 is favorably disposed right behind case 1 in order to avoid attracting the attention of users to hot-water tank 13.

Canister 11 is to be filled with raw material powders which become the ingredients of beverages and to hold the raw material powders therein. Canister 11 includes: discharge section 11A formed at a lower front-face portion; and lid 11B used to keep a powder filling port having an upward opening closed in a freely openable manner. In addition, a powder discharge mechanism (not illustrated) extends near the bottom of canister 11. This powder discharge mechanism is used for discharging the raw material powders within canister 11 to agitation vessel 14 to be described, hereinafter.

This powder discharge mechanism has a structure in which rotation blades are spirally provided around the rotary shaft, and the front end of the rotary shaft is disposed facing discharge section 11A, for example. When canister motor 11M drives the rotation blades, the raw material powders placed between the rotation blades are in turn sent out to discharge section 11A. Note that, canister 11M is driven and controlled by control section 20 to be described hereinafter.

In addition, chute 12 is connected to discharge section 11A of canister 11 in order to appropriately guide the raw material powders discharged from canister 11 to agitation vessel 14.

Note that, although FIG. 3 illustrates only one canister 11, beverage supply apparatus 100 according to the embodiment of the present invention may include a plurality of canisters. In this configuration, these canisters are filled with different kinds of raw material powders, such as milk powders, coffee powders, and cocoa powders, respectively. Mixing and agitating these different kinds of raw material powders and hot water in agitation vessel 14 to be described hereinafter enables beverage supply apparatus 100 to provide a large number of different kinds of beverages.

Chute 12 is composed of a substantially cylindrical component having open upper and lower ends. Discharge section 11A of canister 11 is connected to the upper end of chute 12. In addition, the lower portion of chute 12 has a funnel shape that becomes thinner as the portion extends downward, while the lower end portion of chute 12 is connected to agitation vessel 14. Hot-water introducing section 12A that is connected to hot-water tank 13 to introduce the hot water supplied from hot-water tank 13 into the inside of chute 12 is formed at a lateral surface portion of chute 12.

Hot-water tank 13 is a water storage section capable of storing therein several liters of drinking water. Hot-water tank 13 includes heater 13A that heats the stored water to 94 to 97 degrees, for example, and keeps the water at the temperature. Moreover, examples of components (not illustrated) attached to hot-water tank 13 include a water level sensor, a bimetal thermostat for preventing heating without water, and a hot-water temperature sensor or the like for detecting the temperature of the hot water in hot-water tank 13. When the hot-water temperature sensor detects that the temperature of hot water has decreased below 94 degrees, heater 13A heats the water in hot-water tank 13 on the basis of control by control section 20, thus keeping the temperature of the hot water within the temperature range mentioned above.

Hot-water supply tube 13B for guiding the hot water in the tank to beverage supply port 5a or chute 12 is connected to hot-water tank 13. Hot-water electromagnetic valve 13C is provided near the end portion of hot-water supply tube 13B on the side of hot-water tank 13. Hot-water electromagnetic valve 13C opens and closes under the control by control section 20 to be described, hereinafter, thus, adjusting the amount of water supplied from hot-water tank 13.

Agitation vessel 14 houses therein the raw material powders supplied from canister 11 and the hot water supplied from hot-water tank 13 and agitates the raw material powders and hot water to make beverages. Agitation vessel 14 is formed in a substantially cylindrical shape with one end provided with agitation motor 14M and the other end provided with nozzle 14A.

Agitation blades (not illustrated) that rotate within agitation vessel 14 are attached to the rotary shaft of agitation motor 14M. Agitation motor 14M rotates on the basis of the control by control section 20 to be described hereinafter and favorably agitates the raw material powders and hot water using the agitation blades to make beverages.

Nozzle 14A is included in beverage supply port 5b illustrated in FIG. 1 and supplies the beverage made in agitation vessel 14 to a beverage container.

Figure 4:
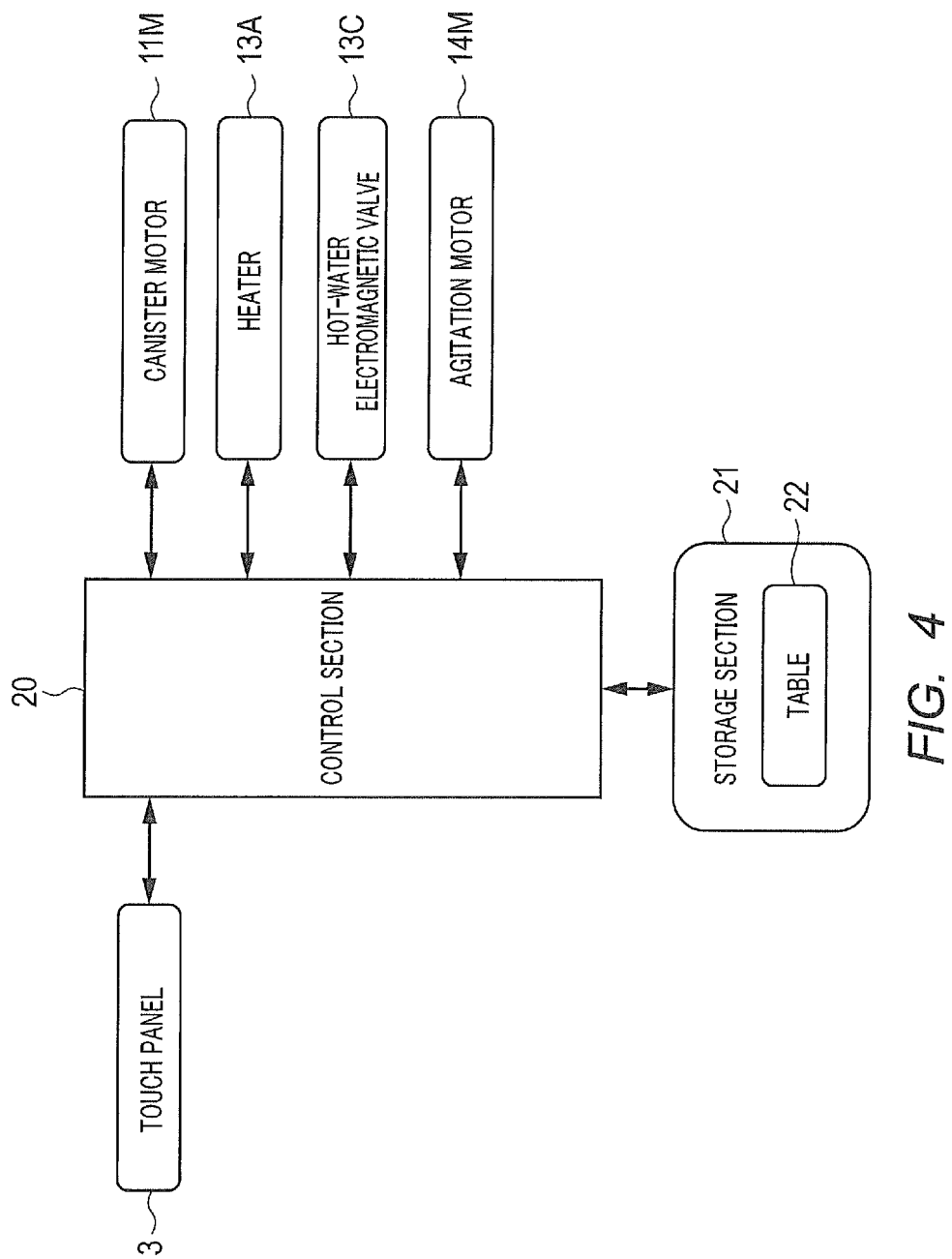
FIG. 4 is a functional block diagram of the beverage supply apparatus according to the embodiment of the present invention.

Next, a description will be given of control blocks of beverage supply apparatus 100 with reference to FIG. 4.

[Control Section 20]

Control section 20 is a control device, such as a central processing unit (CPU) and controls functional sections included in beverage supply apparatus 100. Storage section 21 is a memory device, such as a read only memory (ROM) or random access memory (RAM), and stores therein table 22 to be described hereinafter, for example.

Control section 20 controls touch panel 3 and supply of beverages on the basis of the data read from storage section 21. Hereinafter, the processing flow during supply of a beverage by control section 20 will be described briefly.

[Processing Flow During Supply of Beverage by Control Section 20]

When the user performs an operation to select a beverage on touch panel 3, control section 20 reads data on the selected beverage from storage section 21 and makes the beverage on the basis of the read data. Examples of this data include data on a blend ratio of the raw material powders placed in canister 11 and hot water, setting data for driving canister motor 11M and opening and closing hot-water electromagnetic valve 13C in accordance with the blend ratio, and setting data for driving agitation motor 14M in order to agitate the raw material powders and hot water within agitation vessel 14 to make beverages favorably.

When the user performs an operation to select a beverage on touch panel 3, control section 20 reads table 22 from storage section 21. Table 22 stores therein information indicating whether the hot water or beverage selected by the user is supplied from beverage supply port 5a or 5b.

FIG. 5 illustrates an example of table 22. As illustrated in FIG. 5, information about the beverage supply ports used for dispensing hot water and beverages are registered in association with hot water and kinds of beverages in table 22. A plurality of kinds of drinks that can be supplied by beverage supply apparatus 100 are classified in a way that allows the users to find a desired drink. Categories 1 to 4 illustrate the classifications.

More specifically, the classifications are made as follows: category 1="coffee (hot)," category 2="cocoa (hot)," category 3="coffee (iced)," and category 4="cocoa (iced)," for example. Category 1 includes drink 1="espresso," drink 2="mild espresso," drink 3="americano," drink 4="latte," and "drink 5="espresso con panna," for example. Other categories include a plurality of kinds of drinks like category 1.

As illustrated in FIG. 5, hot water is associated with beverage supply port 5a in table 22. Note that, the term "hot water" used herein refers to simple hot water used for extracting green tea, tea, herb tea, or the like with a tea bag additionally supplied to the users, for example. As illustrated in FIG. 5, categories 1 to 4 are associated with beverage supply port 5b in table 22.

When the user performs an operation to select hot water or a beverage on touch panel 3, control section 20 makes notification to indicate beverage support port 5a upon selection of hot water and makes notification to indicate beverage support port 5b upon selection of a beverage in categories 1 to 4 other than hot water. This notification is made by displaying on touch panel 3 by control section 20, an arrow clearly indicating one of the beverage supply ports and/or a sentence such as "put your cup on your left" or "put your cup in the center," for example.

This notification eliminates a situation where the user wonders whether to put the beverage container at container space 6a or 6b during the use of the apparatus. In addition, it is possible to avoid a situation where the user puts the beverage container at a wrong container space and a high-temperate beverage spills, thus causing the user to burn himself or herself.

Moreover, in order to receive an instruction to start dispensing a beverage, control section 20 displays indication to prompt pressing of physical button 4. Although details will be given hereinafter, the indication to be displayed herein is a sentence such as "please press the button," or an arrow or the like indicating the position of physical button 4, for example, and is displayed at a predetermined position on touch panel 3. Alternatively, control section 20 may prompt the user to press physical button 4 by lighting the LED provided at physical button 4.

When the user presses physical button 4, hot water or the selected kind of beverage is dispensed from the corresponding beverage supply port. Thus, the beverage selected by the user is supplied to the beverage container.

[Details of Control by Control Section 20]

Hereinafter, a detailed description will be given of control by control section 20 during supply of a beverage, particularly; a description will be given of display control of touch panel 3.

Control Example 1

Figure 6:
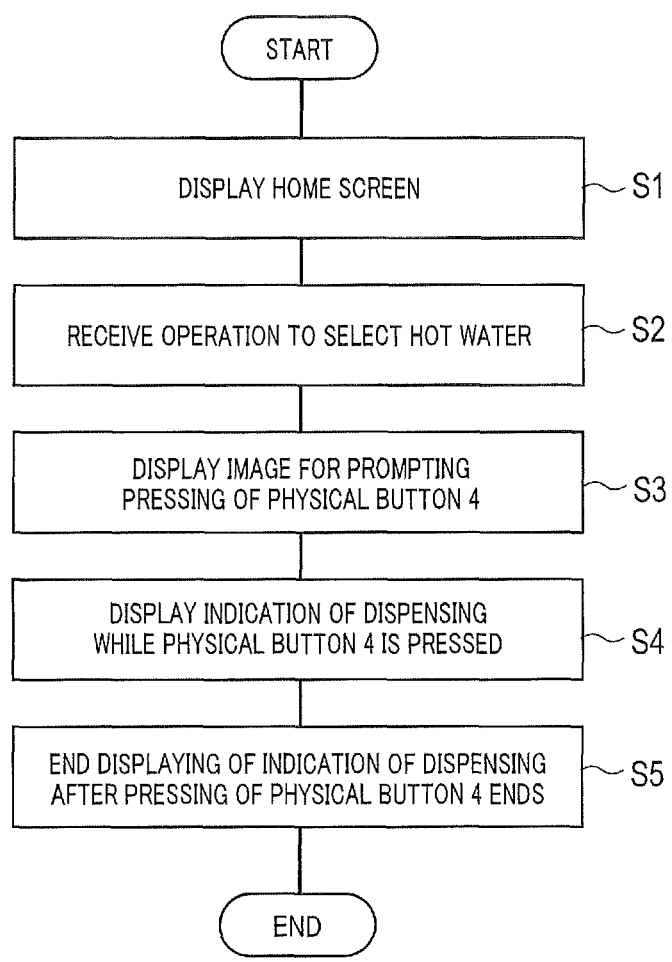
FIG. 6 is a flowchart illustrating control example 1 of the beverage supply apparatus according to the embodiment of the present invention.
Figure 7:
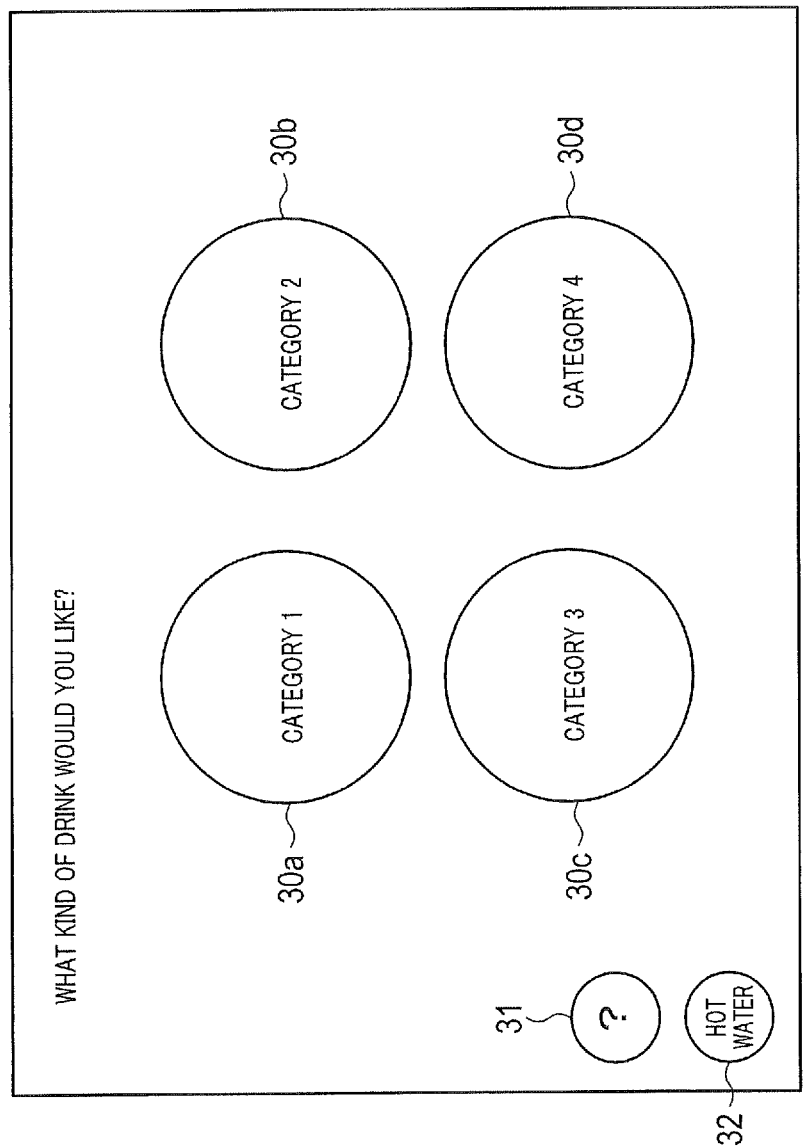
FIG. 7 is a diagram illustrating a display example of a home screen of the beverage supply apparatus according to the embodiment of the present invention.
Figure 8:
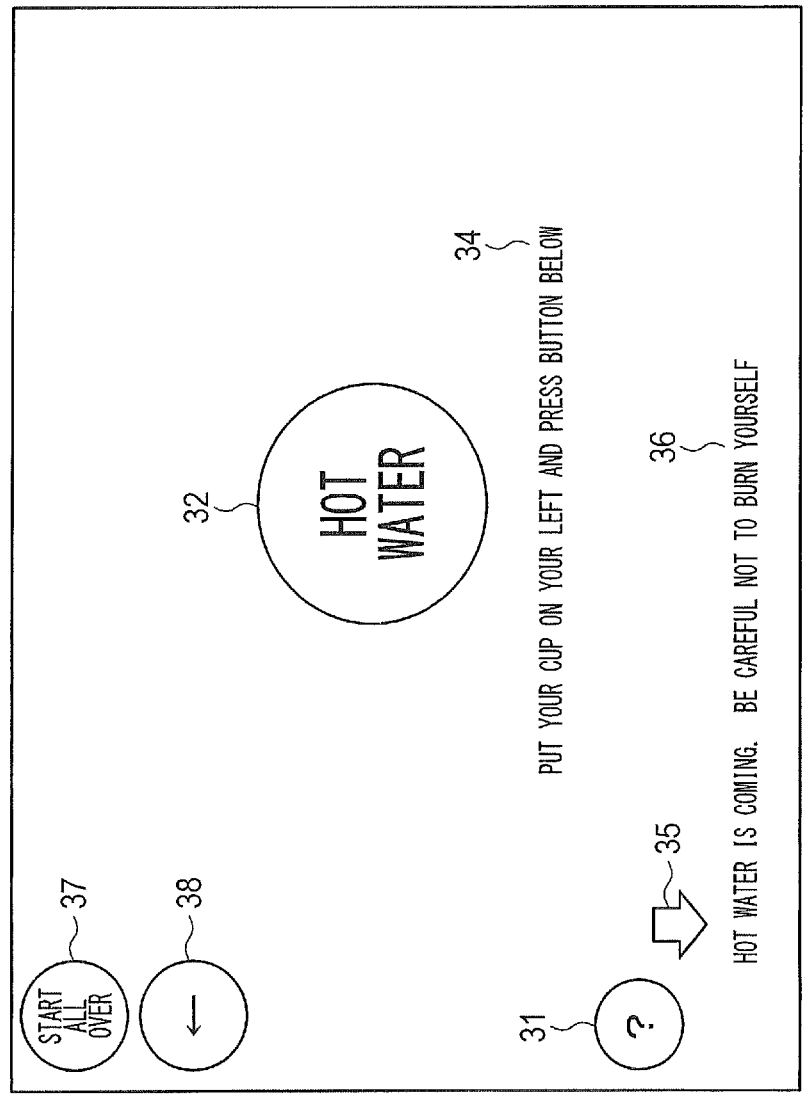
FIG. 8 is a diagram illustrating a display example of a pressing-instruction screen according to control example 1 of the beverage supply apparatus according to the embodiment of the present invention.
Figure 9:
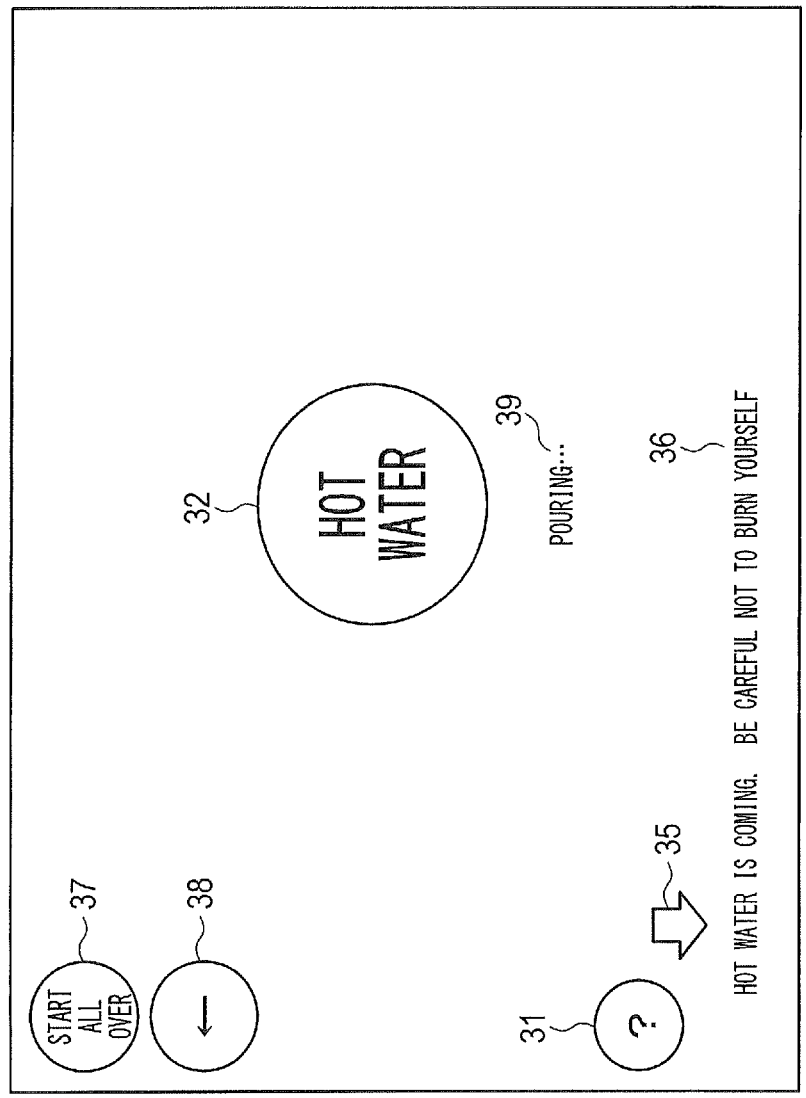
FIG. 9 is a diagram illustrating a display example of a "dispensing" screen according to control example 1 of the beverage supply apparatus according to the embodiment of the present invention.

First, a control example of a case where only supply of hot water is selected will be described using FIGS. 6 to 9. FIG. 6 is a flowchart illustrating an example of control by control section 20 in control example 1. FIGS. 7 to 9 are each a diagram illustrating a screen display example of touch panel 3.

First, control section 20 reads image data of a home screen stored in storage section 21 and causes touch panel 3 to display the home screen (step S1)

FIG. 7 illustrates a display example of the home screen. As illustrated in FIG. 7, category selection buttons 30a to 30d, help button 31, and hot-water button 32 are displayed on the home screen.

Category selection buttons 30a to 30d are buttons for receiving a touch operation performed by the user for selecting a kind of beverage (hereinafter, the touch operation is referred to as "pressing").

Help button 31 is a button to be pressed by the user when the user wants to know how to operate beverage supply apparatus 100 (e.g., how to operate the currently displayed screen). When help button 31 is pressed, control section 20 reads data on the operation method stored in storage section 21 and causes touch panel 3 to display the data.

Hot-water button 32 is a button to be pressed by the user when the user selects hot water as a beverage. In control example 1, a description will be given of a case where hot-water button 32 is pressed.

When the user presses hot-water button 32, control section 20 receives an operation to select hot water (step S2).

In this case, control section 20 identifies beverage supply port 5a (container space 6a, stated differently) for dispending hot water on the basis of table 22 read from storage section 21. In order to receive an instruction to start dispending a beverage from the user, control section 20 causes touch panel 3 to display pressing-instruction to indicate pressing of physical button 4 (step S3).

Control section 20 reads image data of the pressing-instruction to indicate pressing of physical button 4 from storage section 21 and causes touch panel 3 to display the image. FIG. 8 illustrates an example of a screen when this image is displayed on touch panel 3. FIG. 8 is a diagram illustrating an example of the pressing-instruction screen when hot water is selected.

As illustrated in FIG. 8, hot-water button 32 is moved to the center and displayed in an enlarged manner, while messages 34 and 36 and arrow 35 are displayed below hot-water button 32 on the pressing-instruction screen when hot water is selected. Message 34 is a message to clearly notify the user of where to put the beverage container as well as to instruct the user to press physical button 4. Arrow 35 is an arrow to indicate beverage supply port 5a for dispensing hot water and the position of container space 6a. In addition, message 36 is a message to call attention to burns due to dispensing of hot water.

Displaying of messages 34 and 36 and arrow 35 allows the users to easily and clearly recognize that hot water is favorably supplied by putting a beverage container at container space 6a.

Note that, return buttons 37 and 38 are displayed on the upper left of the screen of touch panel 3 on the pressing-instruction screen illustrated in FIG. 8. Return button 37 is a button to be pressed by the user when the user wants to return to the home screen. Return button 38 is a button to be pressed by the user when the user wants to return to the last screen.

When return buttons 37 and 38 are pressed, control section 20 moves the display screen to the home screen and the last screen, respectively.

When the user presses and holds physical button 4 after the pressing-instruction screen illustrated in FIG. 8 is displayed on touch panel 3, control section 20 causes the selected hot water to be dispensed from beverage supply port 5a and causes touch panel 3 to display an indication that hot water is being dispensed while physical button 4 is pressed and held (step 4). Accordingly, the user can adjust the amount of hot water by changing the time during which the user presses and holds physical button 4, so that the user can freely adjust the strength of the beverage when extracting green tea, tea, herb tea, or the like using an additionally provided tea bag, for example. Note that, control section 20 causes hot water to be dispensed while physical button 4 is pressed and held in this case, but control section 20 may cause the amount of hot water that fills a single beverage container to be dispensed when physical button 4 is pressed once, for example.

Control section 20 reads image data of an image which is stored in storage section 21 and which indicates that the beverage is being dispensed (hereinafter, referred to as "dispensing") and causes touch panel 3 to display the image.

FIG. 9 illustrates a display example of the dispensing screen containing the image. FIG. 9 is a diagram illustrating an example of the dispensing screen when hot water is selected.

As illustrated in FIG. 9, hot-water button 32 is moved to the center and displayed in an enlarged manner while messages 36 and 39 and arrow 35 are displayed below hot-water button 32 on this dispensing screen. Message 36 is a message to call attention of the user to burns. Message 39 is a message to notify the user that the beverage is being dispensed. In addition, arrow 35 indicates beverage supply port 5a for dispensing hot water and the position of container space 6a as in the pressing-instruction screen mentioned above.

When the user stops pressing and holding physical button 4, control section 20 stops dispensing the beverage from beverage supply port 5a and ends displaying the indication that the beverage is being dispensed (step S5).

Next, control section 20 controls touch panel 3 to shift to displaying of the pressing-instruction screen illustrated in FIG. 8 from displaying of the dispensing screen illustrated in FIG. 9. Control section 20 may be configured to keep, for a certain period of time (e.g., few seconds) after the end of dispensing hot water, information indicating that hot water has been supplied, while controlling touch panel 3 to keep displaying the pressing-instruction screen to wait for the user to perform an operation to press physical button 4 again.

When the user performs an operation to press physical button 4 again, control section 20 causes hot water to be dispensed from beverage supply port 5a on the basis of the held information.

Accordingly, the user can easily add hot water without performing the operation to select the beverage again.

When the certain period of time elapses after the end of dispensing a beverage, control section 20 controls touch panel 3 to return to displaying of the home screen illustrated in FIG. 7 from the displaying of the pressing-instruction screen illustrated in FIG. 8.

Control Example 2

Figure 10:
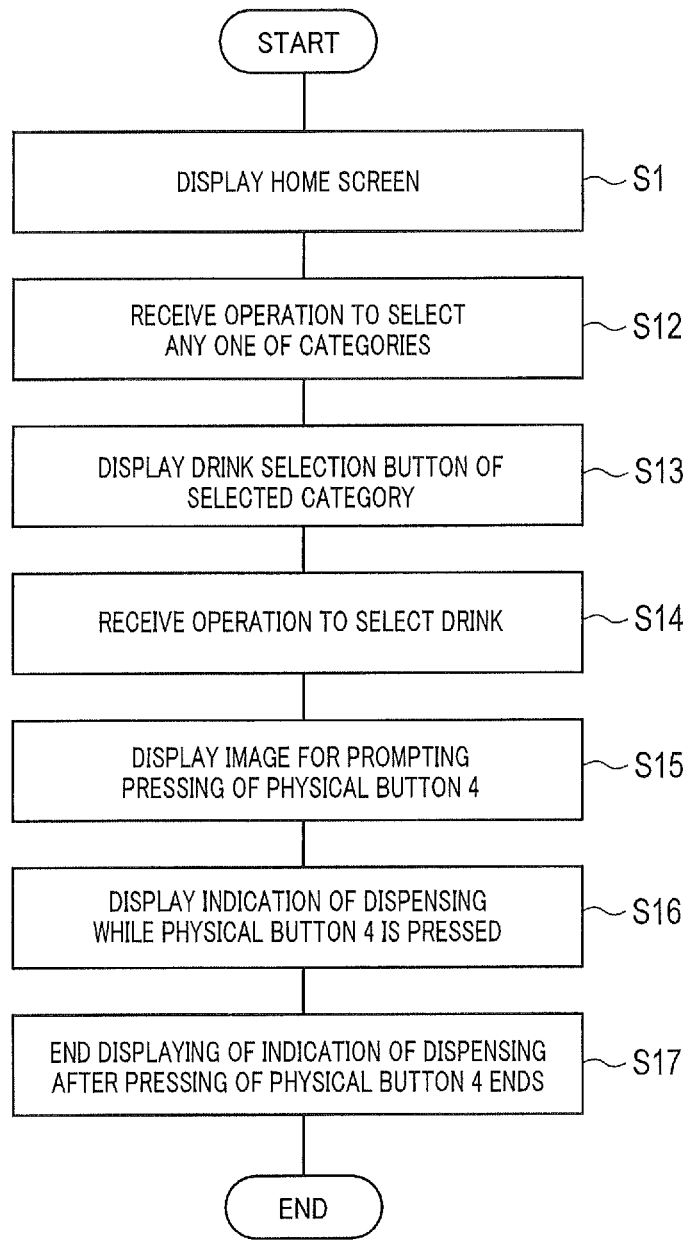
FIG. 10 is a flowchart illustrating control example 2 of the beverage supply apparatus according to the embodiment of the present invention.
Figure 11:
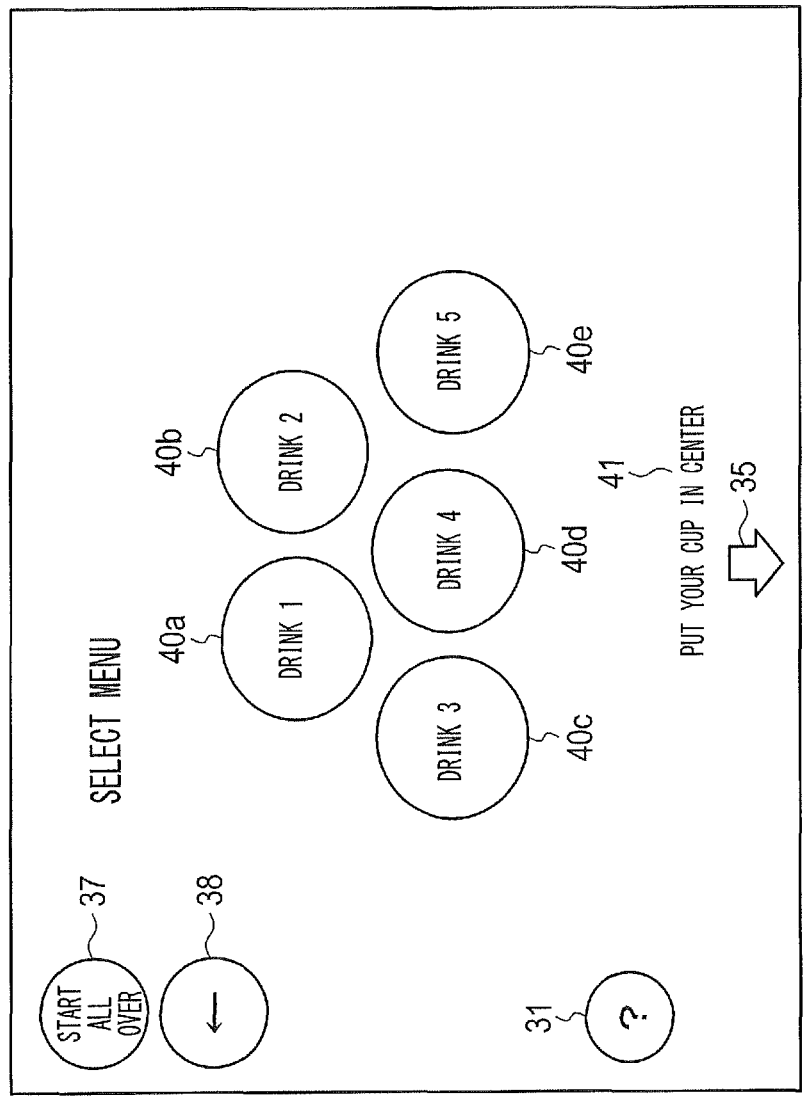
FIG. 11 is a diagram illustrating a display example of a drink-selection screen according to control example 2 of the beverage supply apparatus according to the embodiment of the present invention.
Figure 12:
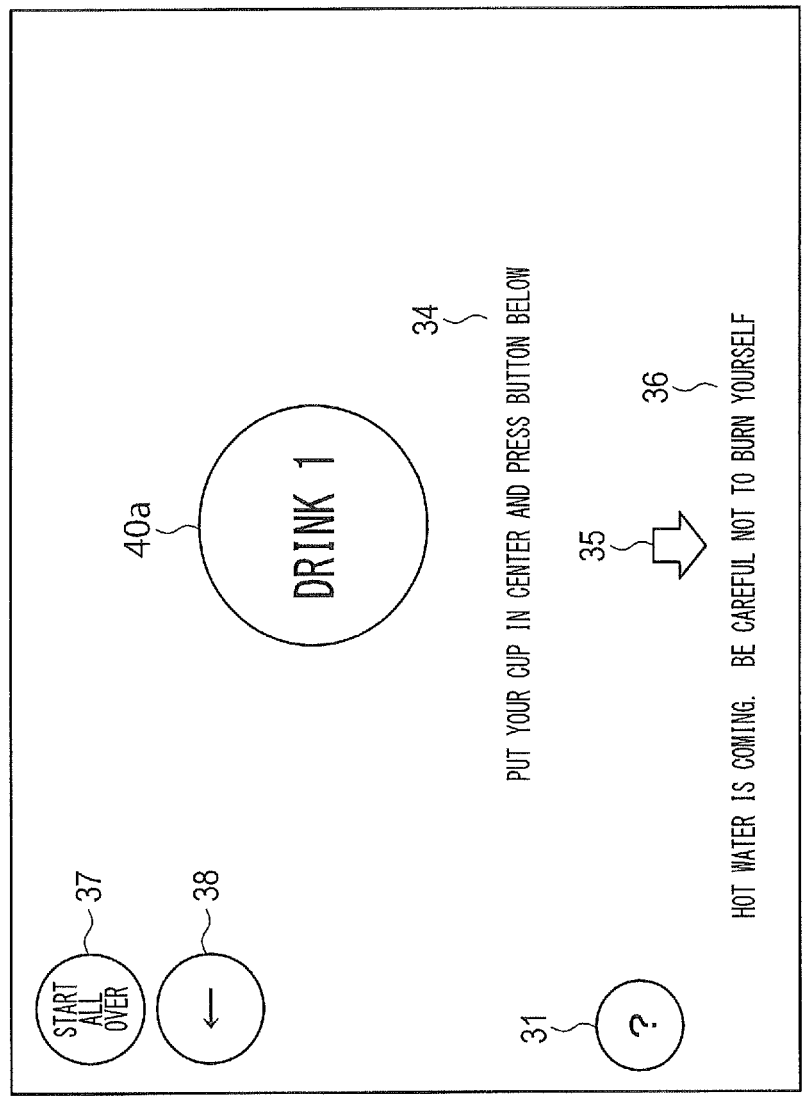
FIG. 12 is a diagram illustrating a display example of a pressing-instruction screen according to control example 2 of the beverage supply apparatus according to the embodiment of the present invention.
Figure 13:
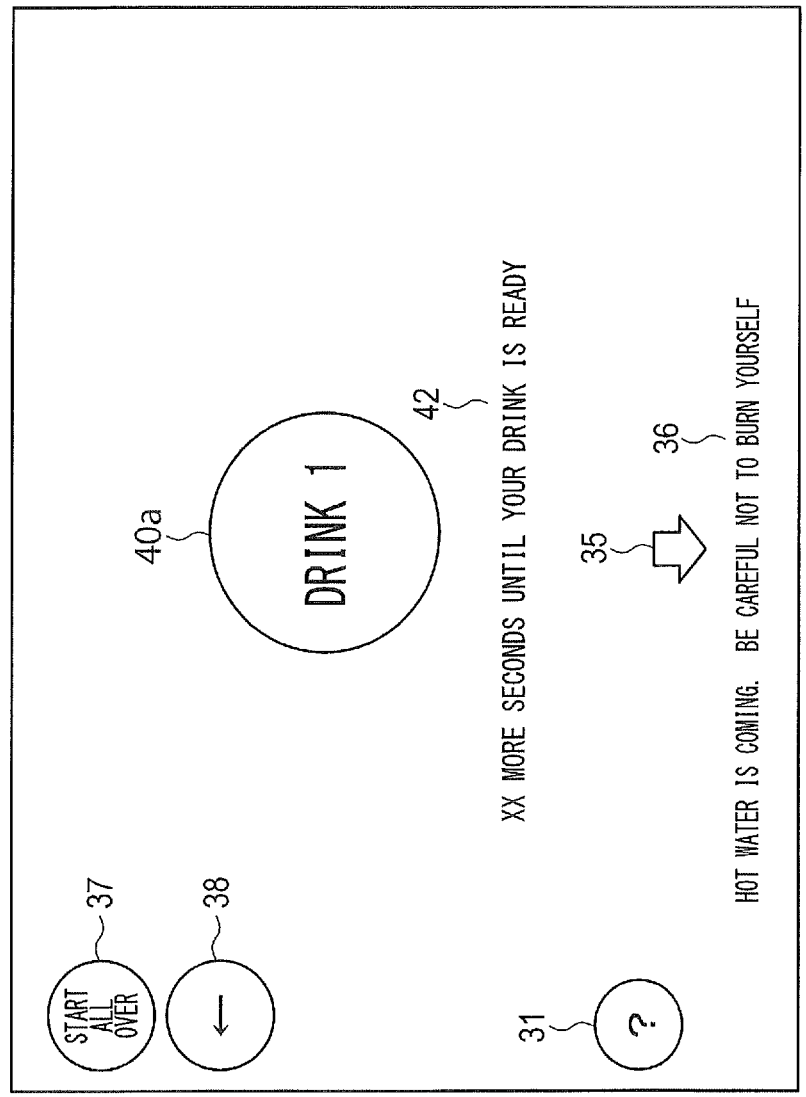
FIG. 13 is a diagram illustrating a display example of a making and dispensing screen according to control example 2 of the beverage supply apparatus according to the embodiment of the present invention.

Next, a description will be given of a control example of a case where category 1 illustrated in FIG. 7 is selected, using FIGS. 10 to 13. FIG. 10 is a flowchart illustrating an example of control by control section 20 in control example 2. FIGS. 11 to 13 are each a diagram of a screen display example of touch panel 3.

First, control section 20 reads image data of a home screen stored in storage section 21 and causes touch panel 3 to display the home screen (step S1). Thus, the home screen illustrated in FIG. 7 is displayed on touch panel 3.

When the user presses category selection button 30a, control section 20 receives the operation to select category 1 (step S12). In this case, control section 20 causes touch panel 3 to display a drink selection button for selecting a beverage included in category 1 (step S13).

Control section 20 reads image data of a drink selection screen containing a drink selection button included in category 1 from storage section 21 and causes touch panel 3 to display the screen, for example.

FIG. 11 illustrates a display example of this drink selection screen. As illustrated in FIG. 11, drink selection buttons 40a to 40e are displayed on this drink selection screen. Drink selection buttons 40a to 40e are buttons to be pressed by the user when the user selects a desired drink Drink selection buttons 40a to 40e correspond to drinks 1 to 5, respectively.

In addition, message 41 and arrow 35 are displayed at a lower portion of the drink selection screen illustrated in FIG. 11. Message 41 identifies beverage supply port 5b corresponding to category 1 selected at step S12, on the basis of table 22, and indicates container space 6b where the user should put the beverage container, such as "*put your cup in the center," for example. Arrow 35 also indicates container space 6b where the user should put the beverage container, likewise.

Displaying message 41 and arrow 35 in the manner described above allows the user to easily recognize that beverage supply port 5b is used for dispensing the beverage, and also that the beverage container should be put at container space 6b corresponding to beverage supply port 5b.

When the user presses any one of drink selection buttons 40a to 40e, control section 20 receives the operation to select the drink (step S14).

Upon reception of the drink selection operation performed by the user, control section 20 causes touch panel 3 to display the pressing-instruction of physical button 4 (step S15). For example, control section 20 reads image data of the pressing-instruction that instructs the user to press physical button 4 from storage section 21 and causes touch panel 3 to display the image.

FIG. 12 illustrates a display example of the pressing-instruction image including this image. FIG. 12 is a diagram illustrating an example of the pressing-instruction screen when drink selection button 40a is selected.

As illustrated in FIG. 12, drink selection button 40a is displayed in an enlarged manner while messages 34 and 36 and arrow 35 are displayed below drink selection button 40a on this pressing-instruction screen. Messages 34 and 36 and arrow 35 are almost the same as those described in control example 1.

Displaying message 34 and arrow 35 in the manner described above allows the user to easily recognize that beverage supply port 5b is used for dispensing the beverage and also that the beverage container should be put at container space 6b corresponding to beverage supply port 5b. In addition, message 36 allows the user to previously recognize that a high-temperature beverage is to be dispensed.

When the user presses physical button 4 after the messages and arrow are displayed, control section 20 makes the selected beverage (drink 1), causes the beverage to be dispensed from beverage supply port 5b and causes touch panel 3 to display a message indicating that the selected beverage is being made or dispensed (step S16).

Control section 20 reads image data of a making and dispensing image stored in storage section 21 and causes touch panel 3 to display the image, for example.

FIG. 13 illustrates a display example of the making and dispensing image. FIG. 13 is a diagram illustrating an example of the making and dispensing screen when drink 1 is selected.

As illustrated in FIG. 13, messages 36 and 42 and arrow 35 are displayed below drink selection button 40a which is displayed in an enlarged manner on this making and dispensing screen. Message 36 and arrow 35 are similar to those described in control example 1. Message 42 computes the time required for completion of making and dispending drink 1 to display the computed time, such as "xx more seconds to be done" (where each "x" takes a number). The information on the time required for completion of making and dispensing a beverage may be previously stored in storage section 21 for each drink, for example.

When the user stops pressing and holding physical button 4, control section 20 stops dispensing the beverage from beverage supply port 5b and ends displaying the indication that the beverage is being made and dispensed (step S17).

Control section 20 controls touch panel 3 to return the screen to displaying of the home screen illustrated in FIG. 7 from displaying of the pressing-instruction screen illustrated in FIG. 13.

The case where category selection button 30a is pressed among category selection buttons 30a to 30d on the home screen illustrated in FIG. 7 has been described thus far. Note that, as to the details of control by control section 20, the case where category selection button 30b is selected is almost the same as those in control example 2.

Moreover, in a case where category selection buttons 30c and 30d are selected on the home screen illustrated in FIG. 7, since the selected categories correspond to iced beverages, a message may be newly displayed on touch panel 3, to the effect that "put some ice in your cup" or the like, for example, i.e., a message instructing the user to put some ice in the beverage container from an outside ice making apparatus in advance. The details of control by control section 20 are almost the same as those in control example 2 except for this point Alternatively, beverage supply apparatus 100 may include an ice making apparatus (not illustrated) and put some ice in the beverage container before dispensing a beverage made in agitation vessel 14, when category selection buttons 30*c* and 30*d* are selected.

As described above, even when a category of iced beverages is selected, control section 20 causes touch panel 3 to display message 36 calling attention of the user to burns because the beverage to be dispensed from beverage supply port 5*b* is a high-temperature beverage made by agitating hot water and raw material powders.

As described above, with beverage supply apparatus 100 according to the embodiment of the present invention, when receiving an operation to select one beverage from options for a plurality of kinds of beverages displayed on touch panel 3, control section 20 identifies the beverage supply port for dispensing the beverage selected by the selection operation from among a plurality of beverage supply ports 5*a* and 5*b* and controls touch panel 3 to indicate a container space corresponding to the beverage supply port for dispensing the beverage. Thus, it is possible to allow the user to easily recognize the beverage supply port for dispensing the beverage and also recognize that the user should put the beverage container at a container space corresponding to the beverage supply port. Accordingly, it is possible to avoid a situation where the user puts the beverage container at a wrong container space and a high-temperate beverage spills, thereby causing the user to burn himself or herself.

Although an embodiment of the present invention has been described thus far, the present invention is not limited to the embodiment described above, and various modifications are also possible.

In the embodiment of the present invention described above, beverage supply apparatus 100 includes single physical button 4 as a component for receiving an instruction to start dispending a beverage and supplies a beverage when the user presses this button, but the present invention is not limited to this configuration. For example, beverage supply apparatus 100 according to the present invention may include no physical button or may include a plurality of physical buttons. When beverage supply apparatus 100 includes no physical button, control section 20 may display a button shaped object on a touch panel and determine that control section 20 receives the instruction to start dispensing a beverage when the user touches the button shaped object. Moreover, when beverage supply apparatus 100 includes a plurality of physical buttons, the plurality of buttons may be previously associated with a plurality of beverage supply ports, and control section 20 may display indication of which physical button should be pressed on touch panel 3 when the user selects a beverage.

In addition, in the embodiment of the present invention, beverage supply apparatus 100 associates hot water with beverage supply port 5*a* and any beverage of categories 1 to 4 with beverage supply port 5*b* in table 22, but the present invention is not limited to this configuration. Beverage supply apparatus 100 of the present invention may associate beverage supply port 5*a* with a beverage of any category, for example. In this configuration, beverage supply port 5*a* may be configured to internally include nozzle 14A as in the case of beverage supply port 5*b* and to dispense a beverage made in agitation vessel 14.

In addition, in the embodiment of the present invention, beverage supply apparatus 100 associates a beverage supply port with a category of the beverage selected by the user in table 22, but the present invention is not limited to this configuration. Beverage supply apparatus 100 of the present invention may be configured to store, in storage section 21, a table in which beverage supply ports are associated with respective beverages included in each category.

In the embodiment of the present invention, when a category including a plurality of beverages is selected on the home screen illustrated in FIG. 7 during selection of a beverage, control section 20 causes touch panel 3 to display the drink selection screen illustrated in FIG. 11 to allow the user to select a beverage, but the present invention is not limited to this configuration. Control section 20 may cause touch panel 3 to display multi-layered screens including layered subcategories. In this configuration, the drink selection screen at the lowermost layer is displayed via a plurality of layers after the home screen at the uppermost layer. In this configuration, each category to be selected on the home screen includes subcategories, and upon selection of a category, a subcategory selection screen (not illustrated) is displayed, and upon selection of a subcategory, the next subcategory selection screen is displayed. Thus, even when the kinds of beverages that can be supplied by beverage supply apparatus 100 increase, appropriate displaying can be performed on touch panel 3.

In addition, although beverage supply apparatus 100 according to the embodiment of the present invention makes beverages by mixing and agitating the raw material powders and hot water, the present invention is not limited to this configuration. The beverage supply apparatus according to the present invention may brew a coffee beverage using grounded coffee beans or may make a beverage by diluting a flavored-syrup or a concentrated original solution with hot water or may make a beverage by dipping tea leaves into hot water to brew tea, for example. Moreover, the beverage supply apparatus according to the present invention may make a beverage using a plurality of methods among the plurality of kinds of methods mentioned above.

REFERENCE SIGNS LIST

100 Beverage supply apparatus
1 Case
2 Front door
3 Touch panel
4 Physical button
5*a*, 5*b* Beverage supply port
6*a*, 6*b* Container space
11 Canister
11A Discharge section
11B Lid
11M Canister motor
12 Chute
12A Hot-water introducing section
13 Hot-water tank
13A Heater
13B Hot-water supply tube
13C Hot-water electromagnetic valve
14 Agitation vessel
14A Nozzle
14M Agitation motor
20 Control section
21 Storage section
22 Table
30*a* to *d* Category selection button
31 Help button
32 Hot-water button
34, 36, 39, 41, 42 Message
35 Arrow
37, 38 Return button
40*a* to *e* Drink selection button

The invention claimed is:

1. A beverage supply apparatus that supplies a plurality of kinds of beverages, the apparatus comprising:
a plurality of beverage supply ports each used for dispensing any one of the plurality of kinds of beverages;
a touch panel that displays options for the plurality of kinds of beverages and that receives a selection operation to select a beverage among the plurality of kinds of beverages;
a control section that identifies a beverage supply port among the plurality of beverage supply ports to dispense the beverage in response to the selection operation, and that controls the touch panel to indicate a beverage container space corresponding to the identified beverage supply port,
wherein the plurality of beverage supply ports are provided below the touch panel.

2. The beverage supply apparatus according to claim 1, further comprising at least one physical button that receives an instruction operation to dispense the beverage selected by the selection operation, wherein
the control section controls the touch panel to indicate the physical button that receives the instruction operation after the beverage is selected by the selection operation.

3. The beverage supply apparatus according to claim 1, further comprising at least one physical button that receives an instruction operation to dispense the beverage selected by the selection operation, wherein
the control section controls the physical button to indicate the physical button that receives the instruction operation after the beverage is selected by the selection operation.

4. The beverage supply apparatus according to claim 1, wherein the control section controls the touch panel to display a screen to prompt an instruction operation to provide an instruction for dispensing the beverage selected by the selection operation, and when the touch panel receives the instruction operation, the control section causes the beverage selected by the selection operation-to be dispensed from the identified beverage supply port.

5. The beverage supply apparatus according to claim 1, wherein the indication of the beverage container space appears at a location corresponding to the identified beverage supply port.

6. The beverage supply apparatus according to claim 5, wherein the indication of the beverage container space appears on the touch panel.

7. The beverage supply apparatus according to claim 1, wherein the control section controls the touch panel to display an arrow indicating a position of the beverage container space.

8. The beverage supply apparatus according to claim 1, wherein the plurality of beverages comprise heated water or a beverage made with heated water.

9. The beverage supply apparatus according to claim 8, wherein the control section controls the touch panel to display a message calling attention to possible burns when heated water or the beverage made with heated water is selected.

* * * * *